(12) United States Patent
Barkan et al.

(10) Patent No.: US 11,566,935 B2
(45) Date of Patent: *Jan. 31, 2023

(54) MODULAR OFF-PLATTER DETECTION ASSEMBLY FOR USE WITH BARCODE READERS

(71) Applicant: ZEBRA TECHNOLOGIES CORPORATION, Lincolnshire, IL (US)

(72) Inventors: Edward Barkan, Miller Place, NY (US); Chinh Tan, East Setauket, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,767

(22) Filed: Sep. 13, 2021

(65) Prior Publication Data

US 2021/0404863 A1 Dec. 30, 2021

Related U.S. Application Data

(63) Continuation of application No. 16/724,060, filed on Dec. 20, 2019, now Pat. No. 11,118,959.

(51) Int. Cl.
*G06K 7/10* (2006.01)
*G01G 19/41* (2006.01)
*G01G 23/37* (2006.01)
*G06K 7/14* (2006.01)
*G01G 19/414* (2006.01)

(52) U.S. Cl.
CPC ..... *G01G 23/3735* (2013.01); *G01G 19/4144* (2013.01); *G06K 7/10792* (2013.01); *G06K 7/10861* (2013.01); *G06K 7/146* (2013.01)

(58) Field of Classification Search
CPC ........... G06K 7/10792; G06K 7/10861; G01G 19/4144
USPC .................................................. 235/462.13
See application file for complete search history.

(56) References Cited

U.S. PATENT DOCUMENTS

2010/0139989 A1* 6/2010 Atwater ............. G01G 23/3735
382/199

* cited by examiner

*Primary Examiner* — Toan C Ly
(74) *Attorney, Agent, or Firm* — Yuri Astvatsaturov

(57) ABSTRACT

A modular off-platter detection assembly for use with a barcode reader includes a housing, a first light source, a first light sensor, and a controller operatively coupled to the first light source and the first light sensor. The housing is configured to be removably mounted to the barcode reader, a frame supporting the barcode reader, or the workstation. The first light source is positioned within the housing and emits a first light along a first lateral edge of a weigh platter. The first light sensor is positioned within the housing, has a first field-of-view along the first lateral edge, and is configured to detect at least a portion of the first light reflected towards the housing. The controller is configured to provide a first alert in response to receipt of a first value from the first light sensor indicating there is an object extending across the first lateral edge.

14 Claims, 10 Drawing Sheets

MODULAR OFF-PLATTER DETECTION ASSEMBLY FOR USE WITH BARCODE READERS

CROSS-REFERENCE TO RELATED APPLICATIONS

This application is a continuation of U.S. patent application Ser. No. 16/724,060, filed on Dec. 20, 2019, and incorporated herein by reference in its entirety.

FIELD OF THE DISCLOSURE

The present patent relates generally to barcode readers and, in particular, to off-platter detection systems for use in barcode readers.

BACKGROUND

One of the functions of a barcode reader with a weigh platter is to weigh produce or other products that are priced by weight in order to assist in determining the price of the produce or product. However, produce and products are varied in shape and size and there can be issues where part of the produce or product sits off of the weigh platter, resulting in incorrect weight measurement and, therefore, incorrect pricing. Therefore, there is a need to be able to identify when produce or products being weighed on a weigh platter extend off of the weigh platter during the weighing process to reduce or eliminate instances of incorrect weight measurement and pricing. In addition, it would be advantageous if a system for identifying when produce or products extend off the weigh platter were field upgradeable, so that the cost of a barcode reader is not increased because of a feature a customer may not want and the system can be removed and easily swapped out if the system were to fail without disassembling the barcode reader.

SUMMARY

In an embodiment, the present invention is a modular off-platter detection assembly for use with a barcode reader configured to be supported by a workstation. The off-platter detection assembly comprises a housing, a first light source, a first light sensor, and a controller operatively coupled to the first light source and the first light sensor. The housing is configured to be removably mounted to the barcode reader, a frame supporting the barcode reader, or the workstation. The first light source is positioned within the housing and is configured to emit a first light along a first lateral edge of a weigh platter of the barcode reader. The first light sensor is positioned within the housing, has a first field-of-view along the first lateral edge, and is configured to detect at least a portion of the first light reflected towards the housing within the first field-of-view. The controller is configured to provide a first alert in response to receipt of a first value from the first light sensor indicating that there is an object extending across the first lateral edge.

In another embodiment, the present invention is a modular off-platter detection assembly for use with a barcode reader configured to be supported by a workstation. The off-platter detection assembly comprises a housing, a first light source, and a first light diffusing barrier. The housing is configured to be removably mounted to the barcode reader, a frame supporting the barcode reader, or the workstation. The first light source is positioned within the housing and is configured to emit a first collimated light beam along a first lateral edge of a weigh platter of the barcode reader. The first light diffusing barrier is configured to be removably mounted to the barcode reader, the frame supporting the barcode reader, or the workstation, on an opposite side of the weigh platter from the housing and is positioned in a path of the first collimated light beam. The first light diffusing barrier is configured to diffuse the first collimated light beam such that the first light diffusing barrier appears to be illuminated when contacted by the first collimated light beam, indicating that there is no object extending across the first lateral edge of the weigh platter, and appears not to be illuminated when not contacted by the first collimated light beam, indicating that there is an object extending across the first lateral edge of the weigh platter.

In yet another embodiment, the present invention is a barcode reader configured to be supported by a workstation and comprising a housing, a weigh platter, and an off-platter detection system. The housing has a lower housing and an upper housing extending above the lower housing. The weigh platter is positioned within the lower housing and is configured to measure a weight of an object placed on the weigh platter. The weigh platter has an upper surface facing a product scanning region, a proximal edge adjacent the upper housing, a first lateral edge extending non-parallel to the proximal edge, a second lateral edge, opposite the first lateral edge, extending non-parallel to the proximal edge, and a distal edge, opposite the proximal edge, extending non-parallel to the first lateral edge and the second lateral edge. The off-platter detection assembly comprises a first light source, a first light sensor, a first reflector, and a controller operatively coupled to the first light source and the first light sensor. The first light source is configured to emit a first light along the first lateral edge of the weigh platter. The first light sensor has a first field-of-view along the first lateral edge and is configured to detect at least a portion of the first light reflected towards the first light sensor within the first field-of-view. The first reflector is positioned in a path of the first light and within the first field-of-view of the first light sensor. The controller is configured to measure a signal strength of the portion of the first light reflected toward the first light sensor and detected by the first light sensor and provide a first alert if the signal strength is less than a predetermined signal strength value, indicating that there is an object extending across the first lateral edge.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
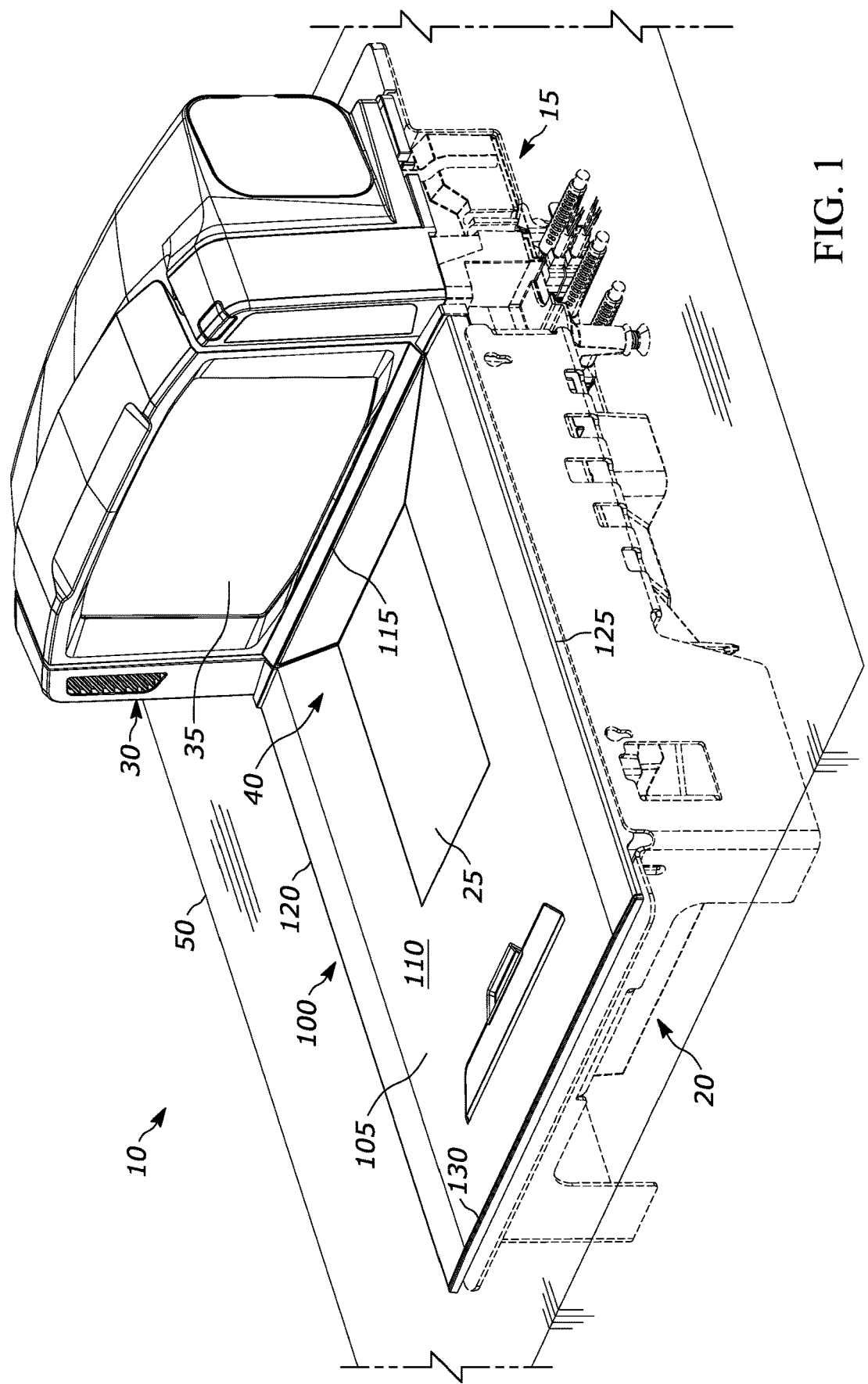
FIG. 1 illustrates a front perspective view of an example barcode reader having a weigh platter assembly.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to barcode readers, such as bioptic barcode readers, having off-platter detection assemblies to identify when an object extends off of the weigh platter of the barcode reader. The off-platter detection assemblies herein are modular and can be removed and replaced from the barcode reader to allow for simplified upgrading of existing barcode readers and installation, removal, replacement, and maintenance of the off-platter detection assemblies. The off-platter detection assemblies have the required electronics contained in a modular housing that is mountable to the weigh platter support features (which may or may not include the barcode scanner). For example, the modular housing can fit into a sheet metal frame or mount on top of a support structure for the weigh platter's load cell, external to the sealed optical cavity of the barcode reader.

Referring to FIG. 1, an example barcode reader 10, such as the Zebra® MP7000 bioptic barcode reader, is shown and can be configured to be supported by a workstation 50, such as a checkout counter at a POS of a retail store. Barcode reader 10 has a housing 15 that includes a lower housing 20 that houses a weigh platter assembly 100 and an upper housing 30 that extends above lower housing 20. Upper housing 30 includes a generally vertical window 35 to allow a first set of optical components positioned within housing 15 to direct a first field-of-view through vertical window 35. In addition, if barcode reader 10 is a bioptic barcode reader, lower housing 20 will include a generally horizontal window 25, which in the example shown is positioned in a weigh platter 105 of weigh platter assembly 100 to allow a second set of optical components positioned within housing 15 to direct a second field of view through horizontal window 25. The first and second fields of view intersect to define a product scanning region 40 of barcode reader 10 where a product can be scanned for sale at the POS.

Weigh platter assembly 100 will generally include a weigh platter 105 positioned within lower housing 20 and that is configured to measure the weight of an object placed on weigh platter 105. Weigh platter 105 has an upper surface 110 that is generally parallel to a top surface of workstation 50 and faces product scanning region 40, a proximal edge 115, a first lateral edge 120, a second lateral edge 125, and distal edge 130. In the example shown, proximal edge 115 is adjacent upper housing 30 and would be the edge furthest from a user of weigh platter assembly 100 and/or barcode reader 10. First lateral edge 120 extends non-parallel to proximal edge 115. Second lateral edge 125 is opposite first lateral edge 120 and also extends non-parallel to proximal edge 115. Distal edge 130 is opposite proximal edge 115, would be the edge closest to the user, and extends non-parallel to first lateral edge 120. In the example shown, weigh platter is generally rectangular and first and second lateral edges 120, 125 are perpendicular to proximal edge 115 and distal edge 130 is perpendicular to first and second lateral edges 120, 125 and parallel to proximal edge 115.

Referring to FIGS. 2-5, barcode reader 10 is illustrated with a first example off-platter detection assembly 200. The example off-platter detection assembly 200 is modular and generally includes a housing 205, a first light source 210 positioned within housing 205, a first light sensor 265 positioned within housing 205, and a controller 290 operatively coupled to first light source 210 and first light sensor 265. Housing 205 is configured to be removably mounted to barcode reader 10, or to a frame supporting barcode reader 10 or workstation 50, and can be mounted by any well-known means, such as by snaps, clips, a press fit, fasteners, etc. In the example shown, housing 205 is configured to be positioned between distal edge 130 of weigh platter 105 and a frame of lower housing 20 of barcode reader 10 and, as shown, can be placed in one or more clearances or cutouts formed in upper surface 110 of weigh platter 105 or can extend over upper surface 110 of weigh platter 105 or extend way from weigh platter 105 of off of weigh platter 105 entirely.

First light source 210 is configured to emit a first light 215 away from housing 205 and along first lateral edge 120 of weigh platter 105. First light source 210 could be an LED that is focused into a narrow beam, similar to an aiming dot used in scanners, a focused laser beam, etc., and first light 215 emitted by first light source 210 could be pulses of light (such as in a light imaging, detection, and ranging (LIDAR) system) or a continuous light beam in the infrared spectrum. First light 215 can have a field-of-view 220 with a central field-of-view axis 225 that extends parallel and generally adjacent to first lateral edge 120 of weigh platter 105.

First light sensor 265 has a first field-of-view 270 along first lateral edge 120 and is configured to detect at least a portion of first light 215, from one or more pulses of light or a continuous infrared light beam, that is reflected towards housing 205 and within first field-of-view 270. First field-of-view 270 of first light sensor 265 also has a first central field-of-view axis 275 that extends parallel to first lateral edge 120 of weigh platter 105. A first lens 285 can also be positioned in front of first light sensor 265 and configured to focus the reflected portion of first light 215 onto first light sensor 265.

Controller 290 is operatively coupled to first light source 210 and first light sensor 265 and can be located within housing 205 of off-platter detection assembly 200 or could be located within housing 15 of barcode reader 10 and in communication with first light source 210 and first light sensor 265. Controller 290 is configured to provide a first alert in response to receipt of a first value from first light sensor 265 indicating that there is an object extending across first lateral edge 120. For example, if first light source 210 is configured to emit first light 215 as one or more pulses of light, controller 290 can be configured to measure a first time-of-flight of the reflected pulse of light. The first time-of-flight is the time elapsed from when the pulse of light is emitted by first light source 210 to when at least a portion of the pulse of light is reflected back and detected by first light sensor 265. Controller 290 can also be configured to determine if an object extends across first lateral edge 120 and off of weigh platter 105 by determining if the first time-of-flight is less than a first predetermined time-of-flight, which is the predetermined time elapsed from when a light pulse is emitted by first light source 210 to when at least a portion of the pulse of light is reflected back towards housing 205 of off-platter detection assembly 200 from upper housing 30 of barcode reader 10 and is detected by first light sensor 265. If the measured first time-of-flight is equal to the first predetermined time-of-flight, this indicates that there is no object extending across first lateral edge 120. If the first time-of-flight is less than the first predetermined time-of-flight (the first value), this indicates that there is an object extending across first lateral edge 120 and controller 290 can be configured to provide the first alert.

If first light source 210 is configured to emit a continuous infrared light beam, controller 290 can be configured to measure a first signal strength of the portion of the first light 215 reflected towards housing 205 and detected by first light sensor 265. Controller 290 can also be configured to determine if an object extends across first lateral edge 120 and off of weigh platter 105 by determining if the first signal strength of the reflected light is greater than a first predetermined signal strength value, which is the signal strength of the first light 215 reflected off of upper housing 30 of barcode reader 10. If a measured first signal strength is equal to the first predetermined signal strength value, this indicates that there is no object extending across first lateral edge 120. If the measured first signal strength is greater than the first predetermined signal strength (the first value), this indicates that there is an object extending across first lateral edge 120 and controller 290 can be configured to provide the first alert.

Figure 2:
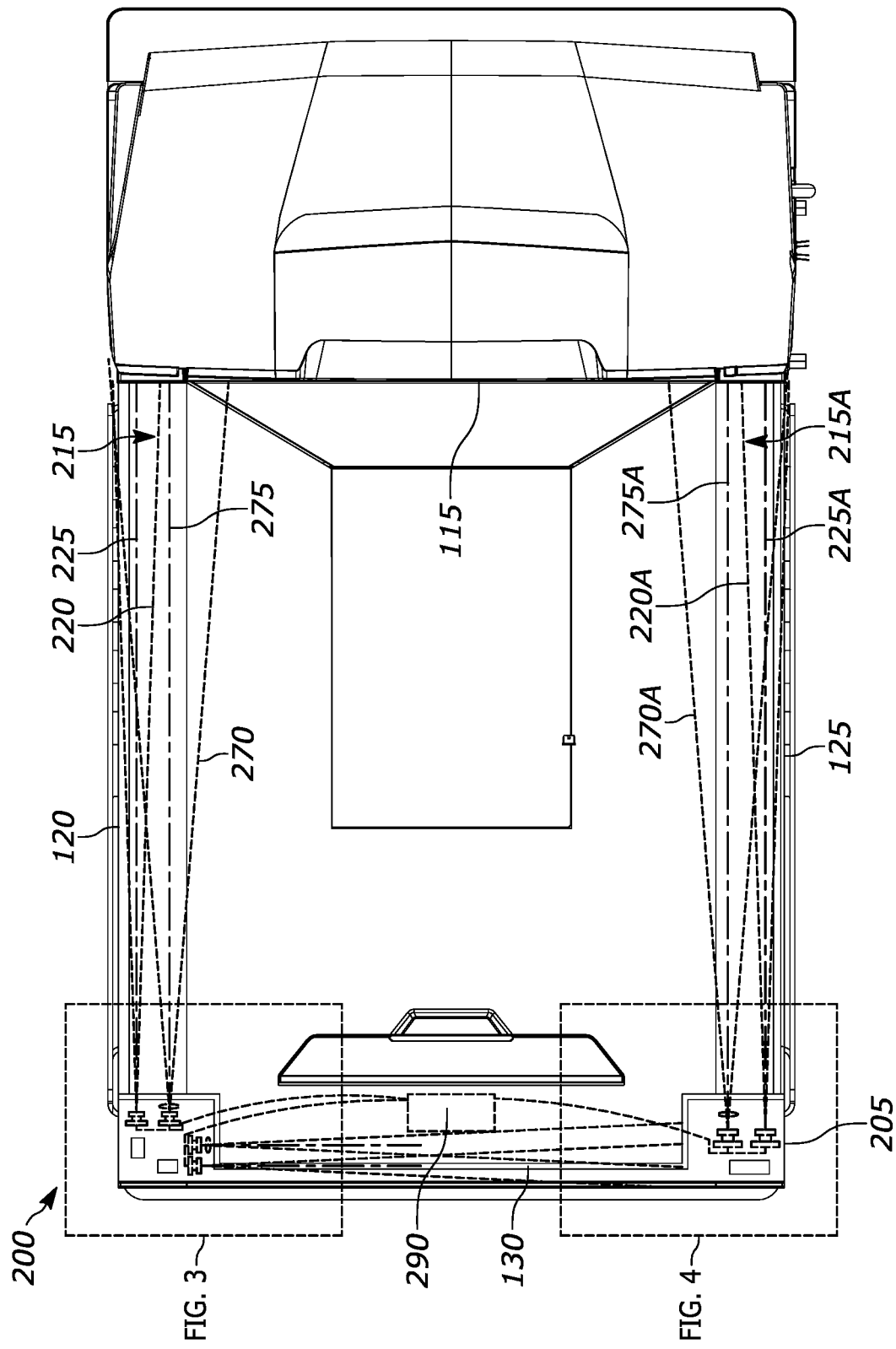
FIG. 2 illustrates a top view of the barcode reader of FIG. 1 with a first example off-platter detection assembly.
Figure 3:
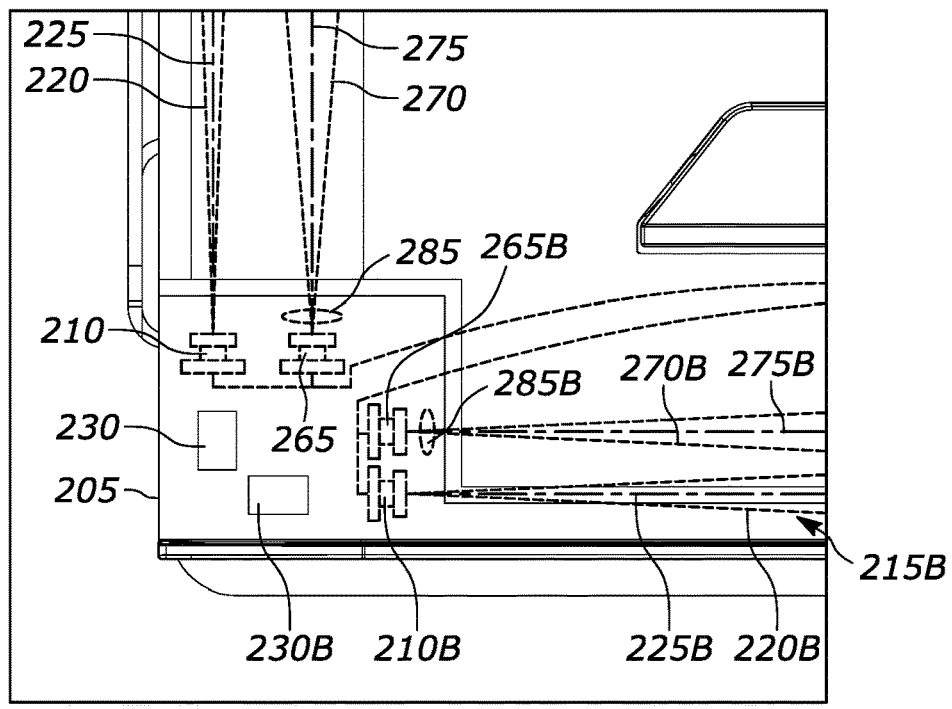
FIG. 3 is an enlarged view of a portion of the barcode reader of FIG. 2.
Figure 4:
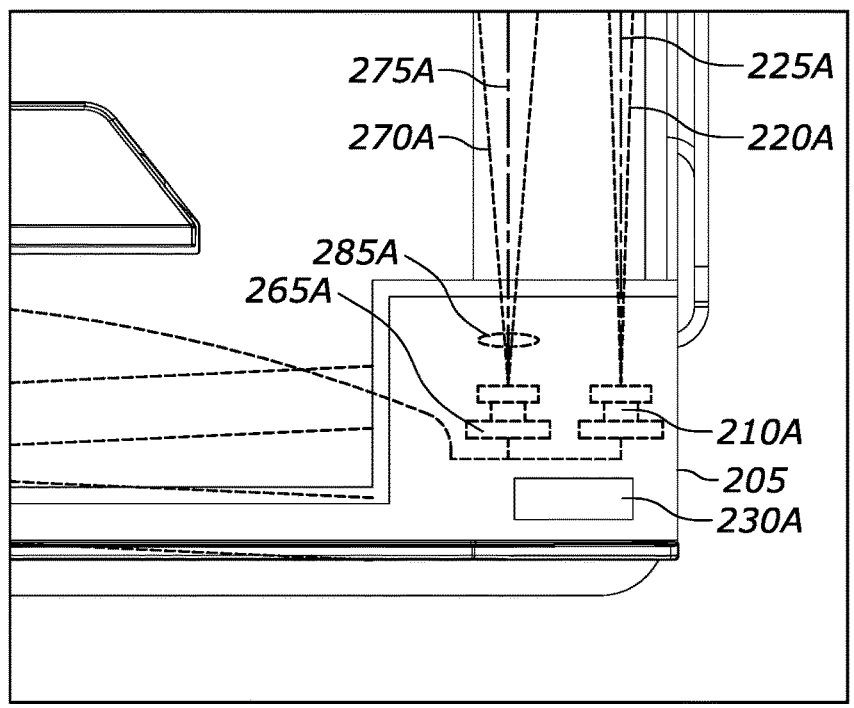
FIG. 4 is an enlarged view of another portion of the barcode reader of FIG. 2.
Figure 5:
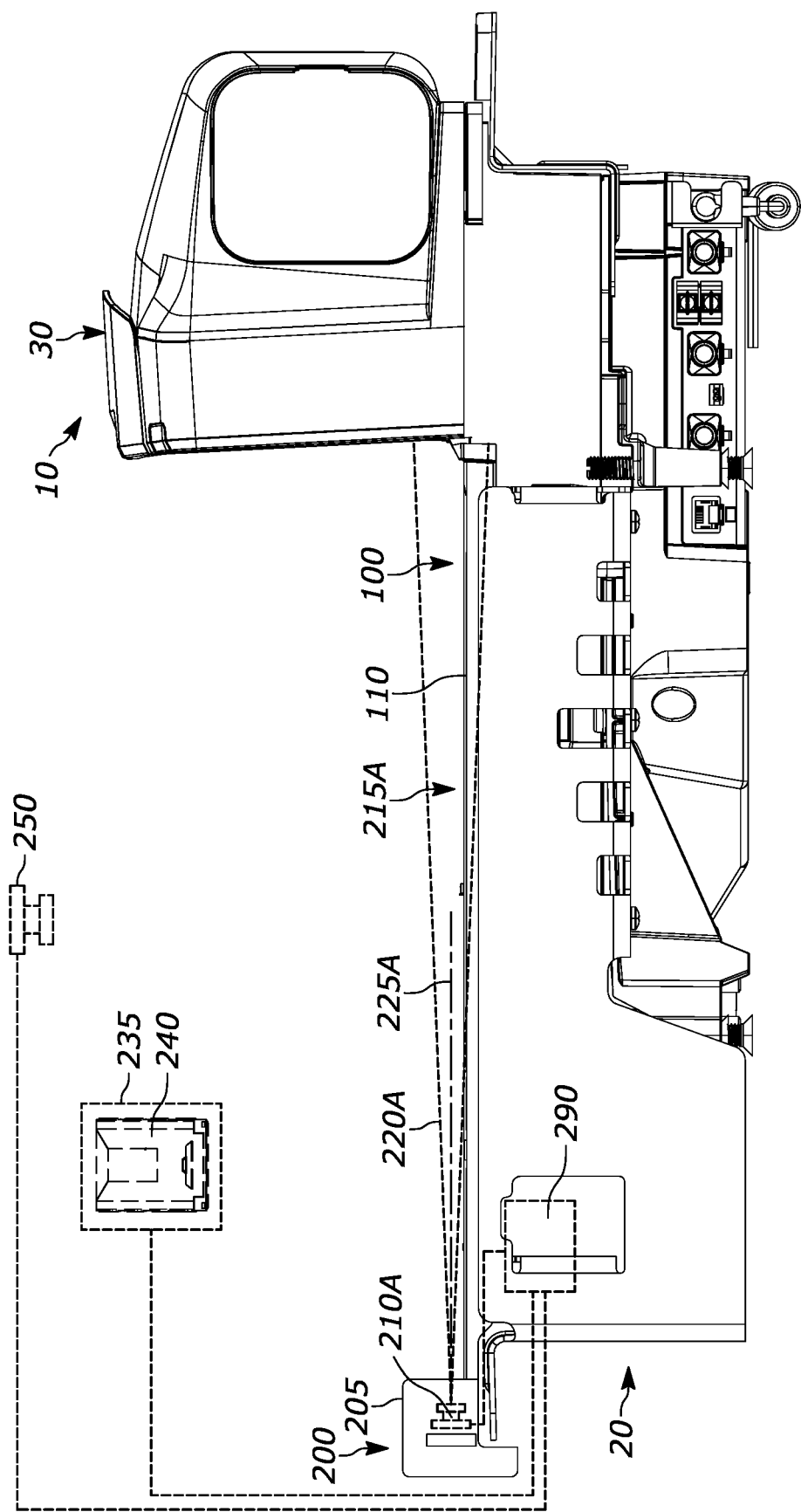
FIG. 5 is a side view of the barcode reader of FIG. 2 with an alternative alert system.
Figure 6:
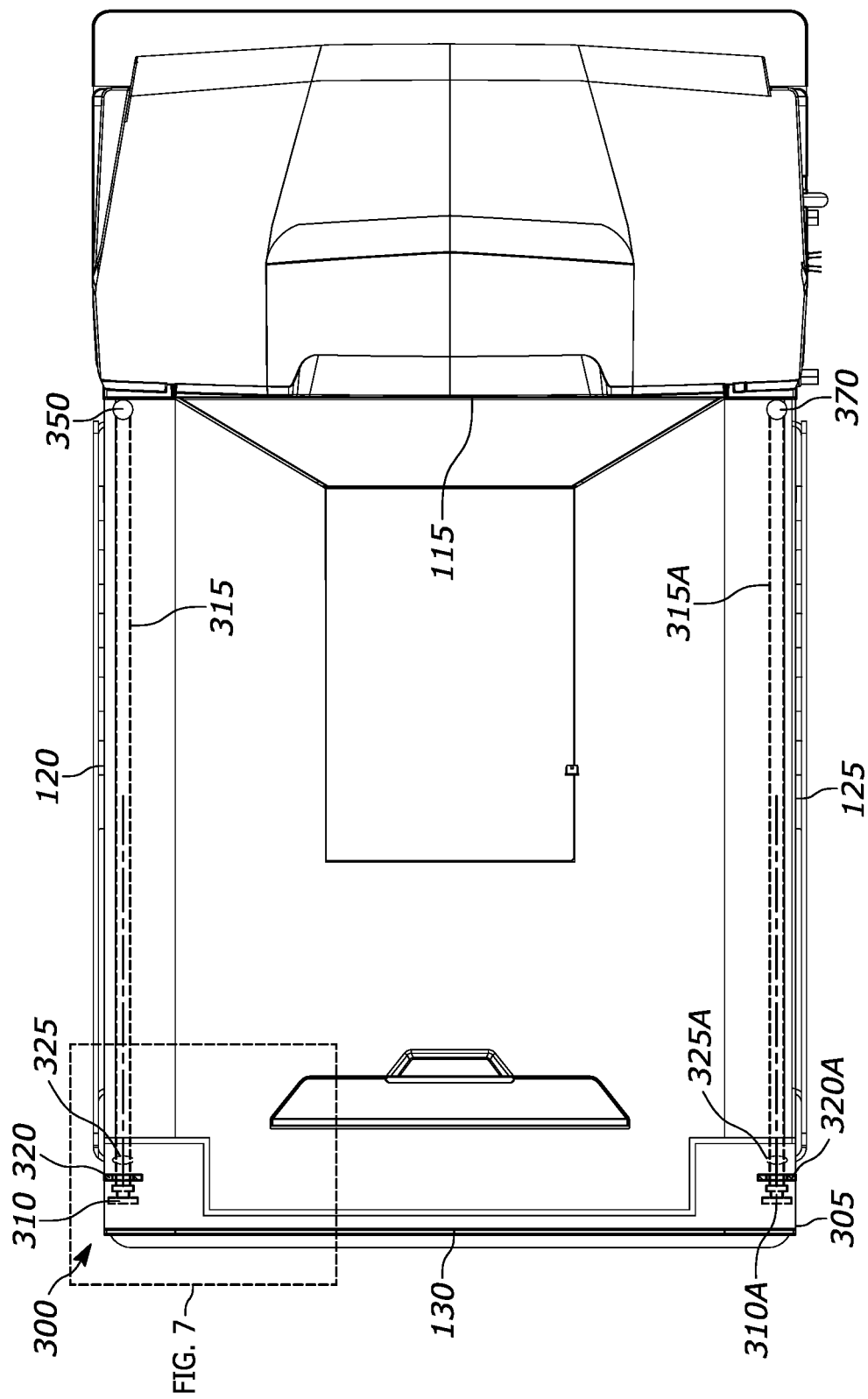
FIG. 6 illustrates a top view of the barcode reader of FIG. 1 with a second example off-platter detection assembly.
Figure 7:
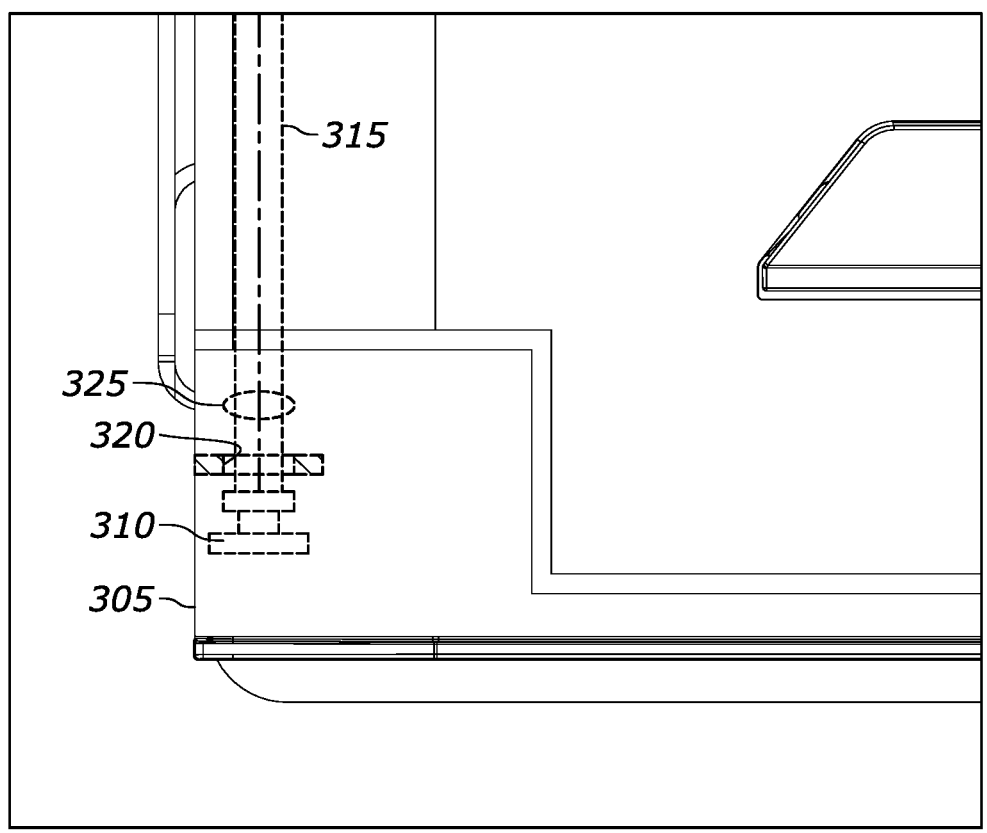
FIG. 7 is an enlarged view of a portion of the barcode reader of FIG. 6.

The first alert provided by controller 290 could be any type of alert that would inform a user that there is a possible off-platter event along first lateral edge 120 of weigh platter 105. For example, as shown in FIGS. 2-4, off-platter detection assembly 200 can have a first visual indicator 230, such as an LED light, set in a top portion of housing 205 and operatively coupled to controller 290 and the first alert could be the controller 290 illuminating first visual indicator 230 to indicate to the user that there is a potential off-platter event along first lateral edge 120. In addition, controller 290 can be configured to, or be operatively coupled to a controller of barcode reader 10 to, prevent a measured weight of an object placed on weigh platter 105 from being recorded in response to the receipt of the first value from first light sensor 265 (the first time-of-flight is less than the first predetermined time-of-flight or the first signal strength is greater than the first predetermined signal strength), indicating that there is potential off-platter event.

Controller 290 can also be configured to determine a location of the object along first lateral edge 120 based on the time-of-flight or the signal strength. If first light source 210 is configured to emit first light 215 as light pulses, the shorter the time-of-flight, the closer the object is to first light sensor 265 and, therefore, to distal edge 130. The longer the time-of-flight, the further the object is from first light sensor 265 and, therefore, from distal edge 130. If first light source 210 is configured to emit first light 215 as a continuous infrared light beam, the higher the signal strength, the closer the object is to first light sensor 265 and, therefore, to distal edge 130. The lower the signal strength, the further the object is from first light sensor 265 and, therefore, from distal edge 130. If controller 290 is configured to determine the location of the object along first lateral edge 120, in addition to or instead of illuminating visual indicator 230 as discussed above, as shown in FIG. 5 the first alert provided by controller 290 could be a display of a platter representation 240 on a visual display 235 operatively coupled to controller 290, such as the display of a POS operatively coupled to barcode reader 10, with an indication 245 of the location where the object extends over first lateral edge 120 displayed in platter representation 240. Platter representation 240 could be any representation of weigh platter 105, such as a live video feed received from an imaging assembly 250 positioned above weigh platter 105 and operatively coupled to controller 290, a photographic representation of weigh platter 105, or a drawing, illustration, or rendering of weigh platter 105.

In addition to monitoring first lateral edge 120 of weigh platter 105 with first light source 210 and first light sensor 265, off-platter detection assembly 200 can also monitor second lateral edge 125 for potential off-platter events with a second light source 210A and a second light sensor 265A, both operatively coupled to controller 290.

Second light source 210A is positioned within housing 205 and is configured to emit a second light 215A away from housing 205 and along second lateral edge 125. Second light source 210A could be an LED that is focused into a narrow beam, similar to an aiming dot used in scanners, a focused laser beam, etc., and second light 215A emitted by second light source 210A could be pulses of light (such as in a light imaging, detection, and ranging (LI DAR) system) or a continuous light beam in the infrared spectrum. Second light 215A can have a second field-of-view 220A with a second central field-of-view axis 225A that extends parallel and generally adjacent to second lateral edge 125.

Second light sensor 265A is positioned within housing 205 and has a second field-of-view 270A along second lateral edge 125 and is configured to detect at least a portion of second light 215A, from one or more pulses of light or a continuous infrared light beam, that is reflected towards housing 205 and within second field-of-view 270A. Second field-of-view 270A of second light sensor 265A also has a second central field-of-view axis 275A that extends parallel to second lateral edge 125. A second lens 285A can also be positioned in front of second light sensor 265A and configured to focus the reflected portion of second light 215A onto second light sensor 265A.

Controller 290 would also be configured to provide a second alert in response to receipt of a second value from second light sensor 265A indicating that there is an object extending across second lateral edge 125. For example, if second light source 210A is configured to emit second light 215A as one or more pulses of light, controller 290 can be configured to measure a second time-of-flight of the reflected pulse of light. The second time-of-flight is the time elapsed from when the pulse of light is emitted by second light source 210A to when at least a portion of the pulse of light is reflected back and detected by second light sensor 265A. Controller 290 can also be configured to determine if an object extends across second lateral edge 125 and off of weigh platter 105 by determining if the second time-of-flight is less than a second predetermined time-of-flight, which is the predetermined time elapsed from when a light pulse is emitted by second light source 210A to when at least a portion of the pulse of light is reflected back towards housing 205 of off-platter detection assembly 200 from upper housing 30 of barcode reader 10 and is detected by second light sensor 265A. If the measured second time-offlight is equal to the second predetermined time-of-flight, this indicates that there is no object extending across second lateral edge 125. If the second time-of-flight is less than the second predetermined time-of-flight (the second value), this indicates that there is an object extending across second lateral edge 125 and controller 290 can be configured to provide the second alert.

If second light source 210A is configured to emit a continuous infrared light beam, controller 290 can be configured to measure a second signal strength of the portion of the second light 215A reflected towards housing 205 and detected by second light sensor 265A. Controller 290 can also be configured to determine if an object extends across second lateral edge 125 and off of weigh platter 105 by determining if the second signal strength of the reflected light is greater than a second predetermined signal strength value, which is the signal strength of the second light 215A reflected off of upper housing 30 of barcode reader 10. If a measured second signal strength is equal to the second predetermined signal strength value, this indicates that there is no object extending across second lateral edge 125. If the measured second signal strength is greater than the second predetermined signal strength (the second value), this indicates that there is an object extending across second lateral edge 125 and controller 290 can be configured to provide the second alert.

The second alert provided by controller 290 could be any type of alert that would inform a user that there is a possible off-platter event along second lateral edge 125. For example, as shown in FIGS. 2-4, off-platter detection assembly 200 can have a second visual indicator 230A, such as an LED light, set in a top portion of housing 205 and operatively coupled to controller 290 and the second alert could be the controller 290 illuminating second visual indicator 230A to indicate to the user that there is a potential off-platter event along second lateral edge 125. In addition, controller 290 can be configured to, or be operatively coupled to a controller of barcode reader 10 to, prevent a measured weight of an object placed on weigh platter 105 from being recorded in response to the receipt of the second value from second light sensor 265A (the second time-of-flight is less than the second predetermined time-of-flight or the second signal strength is greater than the second predetermined signal strength), indicating that there is potential off-platter event.

If controller 290 is configured to determine the location of the object along second lateral edge 125, in addition to or instead of illuminating second visual indicator 230A as discussed above, as shown in FIG. 5 the second alert provided by controller 290 could be a display of a platter representation 240 on a visual display 235 operatively coupled to controller 290, such as the display of a POS operatively coupled to barcode reader 10, with an indication 245 of the location where the object extends over second lateral edge 125 displayed in platter representation 240. Platter representation 240 could be any representation of weigh platter 105, such as a live video feed received from an imaging assembly 250 positioned above weigh platter 105 and operatively coupled to controller 290, a photographic representation of weigh platter 105, or a drawing, illustration, or rendering of weigh platter 105.

In addition to monitoring first lateral edge 120 of weigh platter 105 with first light source 210 and first light sensor 265 (and possibly second lateral edge 125 with second light source 210A and second light sensor 265A), off-platter detection assembly 200 can also monitor distal edge 130 for potential off-platter events with a third light source 210B and a third light sensor 265B, both operatively coupled to controller 290.

Third light source 210B is positioned within housing 205 and is configured to emit a third light 215B along distal edge 130. Third light source 210B could be an LED that is focused into a narrow beam, similar to an aiming dot used in scanners, a focused laser beam, etc., and third light 215B emitted by third light source 210B could be pulses of light (such as in a light imaging, detection, and ranging (LIDAR) system) or a continuous light beam in the infrared spectrum. Third light 215B can have a third field-of-view 220B with a third central field-of-view axis 225B that extends parallel and generally adjacent to distal edge 130.

Third light sensor 265B is positioned within housing 205 and has a third field-of-view 270B along distal edge 130 and is configured to detect at least a portion of third light 215B, from one or more pulses of light or a continuous infrared light beam, that is reflected towards housing 205 and within third field-of-view 270B. Third field-of-view 270B of third light sensor 265B also has a third central field-of-view axis 275B that extends parallel to distal edge 130. A third lens 285B can also be positioned in front of third light sensor 265B and configured to focus the reflected portion of third light 215B onto third light sensor 265B.

Controller 290 would also be configured to provide a third alert in response to receipt of a third value from third light sensor 265B indicating that there is an object extending across distal edge 130. For example, if third light source 210B is configured to emit third light 215B as one or more pulses of light, controller 290 can be configured to measure a third time-of-flight of the reflected pulse of light. The third time-of-flight is the time elapsed from when the pulse of light is emitted by third light source 210B to when at least a portion of the pulse of light is reflected back and detected by third light sensor 265B. Controller 290 can also be configured to determine if an object extends across distal edge 130 and off of weigh platter 105 by determining if the third time-of-flight is less than a third predetermined time-of-flight, which is the predetermined time elapsed from when a light pulse is emitted by third light source 210B to when at least a portion of the pulse of light is reflected back towards housing 205 from a barrier or another portion of housing 205 and is detected by third light sensor 265B. If the measured third time-of-flight is equal to the third predetermined time-of-flight, this indicates that there is no object extending across distal edge 130. If the third time-of-flight is less than the third predetermined time-of-flight (the third value), this indicates that there is an object extending across distal edge 130 and controller 290 can be configured to provide the third alert.

If third light source 210B is configured to emit a continuous infrared light beam, controller 290 can be configured to measure a third signal strength of the portion of the third light 215B reflected towards housing 205 and detected by third light sensor 265B. Controller 290 can also be configured to determine if an object extends across distal edge 130 and off of weigh platter 105 by determining if the third signal strength of the reflected light is greater than a third predetermined signal strength value, which is the signal strength of the third light 215B reflected off of a barrier or another portion of housing 205. If a measured third signal strength is equal to the third predetermined signal strength value, this indicates that there is no object extending across distal edge 130. If the measured third signal strength is greater than the third predetermined signal strength (the third value), this indicates that there is an object extending across distal edge 130 and controller 290 can be configured to provide the third alert.

The third alert provided by controller 290 could be any type of alert that would inform a user that there is a possible off-platter event along distal edge 130. For example, as shown in FIGS. 2-4, off-platter detection assembly 200 can have a third visual indicator 230B, such as an LED light, set in a top portion of housing 205 and operatively coupled to controller 290 and the third alert could be the controller 290 illuminating third visual indicator 230B to indicate to the user that there is a potential off-platter event along distal edge 130. In addition, controller 290 can be configured to, or be operatively coupled to a controller of barcode reader 10 to, prevent a measured weight of an object placed on weigh platter 105 from being recorded in response to the receipt of the third value from third light sensor 265B (the third time-of-flight is less than the third predetermined time-of-flight or the third signal strength is greater than the third predetermined signal strength), indicating that there is potential off-platter event.

If controller 290 is configured to determine the location of the object along distal edge 130, in addition to or instead of illuminating third visual indicator 230B as discussed above, as shown in FIG. 5 the third alert provided by controller 290 could be a display of a platter representation 240 on a visual display 235 operatively coupled to controller 290, such as the display of a POS operatively coupled to barcode reader 10, with an indication 245 of the location where the object extends over distal edge 130 displayed in platter representation 240. Platter representation 240 could be any representation of weigh platter 105, such as a live video feed received from an imaging assembly 250 positioned above weigh platter 105 and operatively coupled to controller 290, a photographic representation of weigh platter 105, or a drawing, illustration, or rendering of weigh platter 105.

Referring to FIGS. 6-9, barcode reader 10 is illustrated with a second example off-platter detection assembly 300. The example off-platter detection assembly 300 is modular and generally includes a housing 305, a first light source 310 positioned within housing 305, and a first light diffusing barrier 350. Housing 305 is configured to be removably mounted to barcode reader 10, or to a frame supporting barcode reader 10 or workstation 50, and can be mounted by any well-known means, such as by snaps, clips, a press fit, fasteners, etc. In the example shown, housing 305 is configured to be positioned between distal edge 130 of weigh platter 105 and a frame of lower housing 20 of barcode reader 10 and, as shown, can be placed in one or more clearances or cutouts formed in upper surface 110 of weigh platter 105 or can extend over upper surface 110 of weigh platter 105 or extend way from weigh platter 105 of off of weigh platter 105 entirely.

First light source 310 is configured to emit a first collimated light beam 315 from first light source 310 along first lateral edge 120 and above upper surface 110. First light source 310 could be a light emitting diode (LED) light source that is focused into a narrow beam, similar to an aiming dot used in scanners, a focused laser beam, or any other type of light source that can emit a collimated light beam sufficient to illuminate first light diffusing barrier 350. Preferably, first collimated light beam 315 emitted by first light source 310 would be green in color, since that is the color that a user would most likely recognize as 'Go' or 'Proceed' and gives maximum contrast with the illumination emitted by barcode reader 10. Off-platter detection assembly 300 can also include a first aperture 320, which could be formed in a wall or protrusion of housing 305, positioned in front of first light source 310 to focus first collimated light beam 315 into a narrow beam along first lateral edge 120 of weigh platter 105. A first lens 325 can also be positioned in front of first aperture 320 to increase the intensity of first collimated light beam 315.

Figure 8:
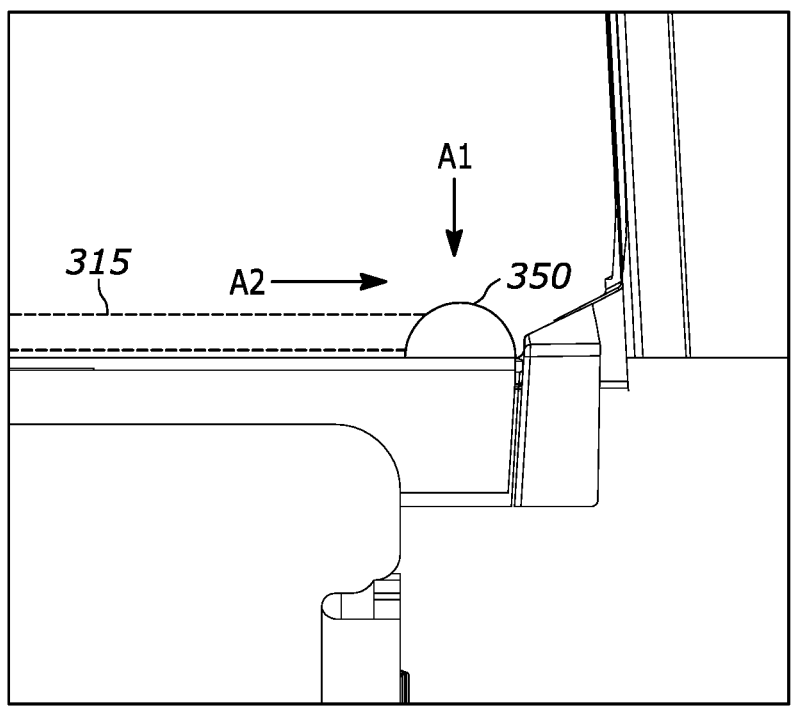
FIG. 8 illustrates an enlarged side view of an example light diffusing barrier of the off-platter detection assembly of FIG. 6.
Figure 9:
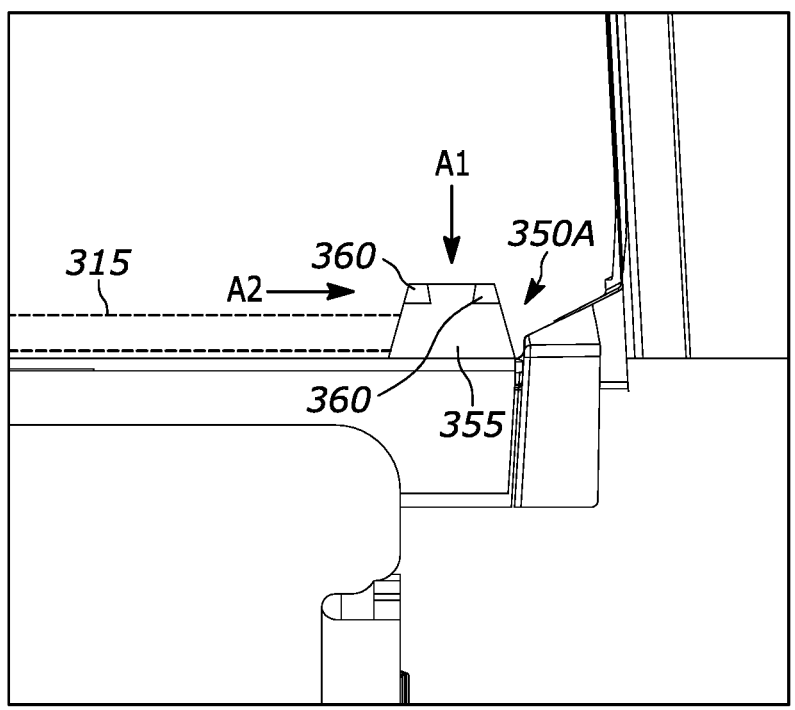
FIG. 9 illustrates an enlarged side view of another example light diffusing barrier.

First light diffusing barrier 350 is configured to be removably mounted to barcode reader 10, the frame supporting barcode reader 10, or the workstation 50, on an opposite side of the weigh platter 105 from housing 305. First light diffusing barrier 350 is positioned in a path of first collimated light beam 315 and is configured to diffuse first collimated light beam 315 such that first light diffusing barrier 350 appears to be illuminated when contacted by first collimated light beam 315, indicating that there is no object extending across first lateral edge 120 of weigh platter 105, and appears not to be illuminated when not contacted by first collimated light beam 315, indicating that there is an object extending across first lateral edge 120. In the example shown, first light diffusing barrier 350 is positioned adjacent proximal edge 115 and is attached to weigh platter 105. However, first light diffusing barrier 350 can be positioned at other locations, as needed or desired, and can also be attached to housing 15 or workstation 50. Preferably, the illumination of first light diffusing barrier 350 will be visible from both a first viewing angle (indicated by arrow A1) that is transverse to upper surface 110 of weigh platter 105 and looking down at upper surface 110 and from a second viewing angle (indicated by arrow A2) that is generally parallel to upper surface 110. For example, as shown in FIG. 8, first light diffusing barrier 350 can have a generally half-spherical shape, which would allow first collimated light beam 315 to be diffused through first light diffusing barrier 350 and be viewable from any angle above upper surface 110. Alternatively, first light diffusing barrier 350 could also have other shapes. For example, in FIG. 9 an alternative first light diffusing barrier 350A is illustrated that has a generally trapezoidal shape and includes a translucent portion 355 that allows the passage of at least a portion of first collimated light beam 315 to pass through first light diffusing barrier 350A and be diffused and one or more opaque portions 360 that prevent the passage of light through opaque portion 360 of first light diffusing barrier 350A. Having both translucent and opaque portions 355, 360 allows first collimated light beam 315 to be diffused through first light diffusing barrier 350A and the illumination of first light diffusing barrier 350A to be visible from first and second viewing angles A1, A2, while also preventing other extraneous light sources, such as the illumination system of barcode reader 10, from possibly being diffused and illuminating first light diffusing barrier 350A.

In addition to monitoring first lateral edge 120 of weigh platter 105 with first light source 310 and first light diffusing barrier 350, off-platter detection assembly 300 can also monitor second lateral edge 125 for potential off-platter events with a second light source 310A and a second light diffusing barrier 370.

Second light source 310A is positioned within housing 305 and is configured to emit a second collimated light beam 315A from second light source 310A along second lateral edge 125 and above upper surface 110. Second light source 310A could be a light emitting diode (LED) light source that is focused into a narrow beam, similar to an aiming dot used in scanners, a focused laser beam, or any other type of light source that can emit a collimated light beam sufficient to illuminate second light diffusing barrier 370. Preferably, second collimated light beam 315A emitted by second light source 310A would be green in color, since that is the color that a user would most likely recognize as 'Go' or 'Proceed' and gives maximum contrast with the illumination emitted by barcode reader 10. Off-platter detection assembly 300 can also include a second aperture 320A, which could be formed in a wall or protrusion of housing 305, positioned in front of second light source 310A to focus second collimated light beam 315A into a narrow beam along second lateral edge 125 of weigh platter 105. A second lens 325A can also be positioned in front of second aperture 320A to increase the intensity of second collimated light beam 315A.

Second light diffusing barrier 370 is configured to be removably mounted to barcode reader 10, the frame supporting barcode reader 10, or the workstation 50, on an opposite side of the weigh platter 105 from housing 305. Second light diffusing barrier 370 is positioned in a path of second collimated light beam 315A and is configured to diffuse second collimated light beam 315A such that second light diffusing barrier 370 appears to be illuminated when contacted by second collimated light beam 315A, indicating that there is no object extending across second lateral edge 125 of weigh platter 105, and appears not to be illuminated when not contacted by second collimated light beam 315A, indicating that there is an object extending across second lateral edge 125. In the example shown, second light diffusing barrier 370 is positioned adjacent proximal edge 115 and is attached to weigh platter 105. However, second light diffusing barrier 370 can be positioned at other locations, as needed or desired, and can also be attached to housing 15 or workstation 50. Preferably, the illumination of second light diffusing barrier 370 will be visible from both a first viewing angle that is transverse to upper surface 110 of weigh platter 105 and looking down at upper surface 110 and from a second viewing angle that is generally parallel to upper surface 110. As discussed above for first light diffusing barrier 350, 350A, second light diffusing barrier 370 can also have different shapes, such as a generally half-spherical shape or trapezoidal shape, and include both translucent and opaque portions. Having both translucent and opaque portions allows second collimated light beam 315A to be diffused through second light diffusing barrier 370 and the illumination of second light diffusing barrier 370 to be visible from first and second viewing angles, while also preventing other extraneous light sources, such as the illumination system of barcode reader 10, from possibly being diffused and illuminating second light diffusing barrier 370.

Referring to FIGS. 10-13, barcode reader 10 is illustrated with a third example off-platter detection assembly 400. The example off-platter detection assembly 400 generally includes a first light source 410, a first light sensor 465, a first reflector 455, and a controller 490 operatively coupled to first light source 410 and first light sensor 465. In the example shown, off-platter detection assembly 400 includes a modular housing 405 that is configured to be removably mounted to barcode reader 10, or to a frame supporting barcode reader 10 or workstation 50, and can be mounted by any well-known means, such as by snaps, clips, a press fit, fasteners, etc., and first light source 410 and first light sensor 465 are positioned within housing 405. Preferably, the majority of housing 405 will be located below upper surface 110 of weigh platter 105 when installed, with only enough housing extending above upper surface 110 to contain the necessary light sources and light sensors. However, housing 405 is not required and first light source 410 and first light sensor 465 could also be located within upper housing 30 of barcode reader 10. In addition, in the example shown, housing 405 is configured to be positioned between distal edge 130 of weigh platter 105 and a frame of lower housing 20 of barcode reader 10. Alternatively, housing 405 could also be configured to be positioned between proximal edge 115 of weigh platter 105 and upper housing 30 of barcode reader 10 and, as shown, can be placed in one or more clearances or cutouts formed in upper surface 110 of weigh platter 105 or can extend over upper surface 110 of weigh platter 105 or extend way from weigh platter 105 of off of weigh platter 105 entirely.

As shown, first light source 410 is configured to emit a first light 415 along first lateral edge 120 of weigh platter 105 and away from distal edge 130, towards proximal edge 115. Alternatively, if housing 405 were positioned at proximal edge 115, rather than distal edge 130, or if first light source 410 were located in upper housing 30 rather than housing 405, first light source 410 would emit first light 415 along first lateral edge 120 and away from proximal edge 115, towards distal edge 130. First light source 410 could be an LED or other type of light source that is focused into a narrow beam, similar to an aiming dot used in scanners, a focused laser beam, etc., and first light 415 emitted by first light source 410 could be a continuous light beam in the infrared spectrum. First light 415 can have a field-of-view 420 with a central field-of-view axis 425 that extends parallel and generally adjacent to first lateral edge 120 of weigh platter 105.

First light sensor 465 has a first field-of-view 470 along first lateral edge 120 and is configured to detect at least a portion of first light 415 that is reflected towards first light sensor 465 and within first field-of-view 470. First field-of-view 470 of first light sensor 465 also has a first central field-of-view axis 475 that extends parallel to first lateral edge 120 of weigh platter 105.

First reflector 455 is positioned in a path of first light 415 and within first field-of-view 470 of first light sensor 465 such that first light 415 is reflected off of first reflector 455 towards first light sensor 465 and can be detected by first light sensor 465. As shown, first reflector 455 is positioned at proximal edge 115 of weigh platter 105, opposite first light source 410 and first light sensor 465. Alternatively, first reflector 455 could also be positioned on or adjacent upper housing 30 or weigh platter 105 of barcode reader 10 or in a recess formed in upper housing 30 or weigh platter 105 to protect first reflector 455 from damage. Conversely, if housing 405 were located at proximal edge 115 or if first light source 410 and first light sensor 465 were located in upper housing 30, as discussed above, first reflector 455 would be positioned at distal edge 130 of weigh platter. First reflector 455 could be any type of reflective surface, such as a retroreflective sticker, a mirror, a corner cube retroreflector, or a cat's eye retroreflector, and preferably is sized appropriately to ensure that the signal strength of the reflected light from an object placed in front of first reflector 455, such as a white object, does not exceed the signal strength of the reflected light from first reflector. For example, first reflector can have a width of approximately 11 millimeters and a height of approximately 6 millimeters to provide optimal reflection of first light 415 back to first light sensor 465.

To prevent first light sensor 465 from detecting too much reflected light from an object being weighed, which could result in a failure to detect an off-platter event, first field-of-view 420 of first light 415 and first field-of-view 470 of first light sensor 465 overlap at a distance D from first light sensor 465 that is approximately 25% or greater of the length L of weigh platter 105 from proximal edge 115 to distal edge 130. The chance of such an occurrence is decreased significantly the further the point of overlap is extended out from first light sensor 465 since objects that are close to first light sensor 465 would not be "seen" by first light sensor 465 (although the object would still block the reflected light from first reflector 455 and, therefore, generate an off-platter event).

In addition, to achieve optical gain control, a first lens 485 can also be positioned in front of first light sensor 465 and configured to focus first field-of-view 470 of first light sensor 465 at first reflector 455 such that first field-of-view 470 of first light sensor 465 covers the entire first reflector 455, which will also defocus first field-of-view 470 at points closer to first light sensor 465. Doing this can maximize the amount of reflected light off of first reflector 455 that is seen by first light sensor 265 and maximize the signal strength detected by first light sensor 465 of first light 415 reflected from first reflector 455 and minimize the signal strength detected by first light sensor 465 of first light 415 reflected from objects closer to first light sensor 465 than first reflector 455, since all of the reflected light from each point on first reflector 455 is returned to first light sensor 465, which in turn maximizes the signal strength of the reflected light received from first reflector 455. At the same time, the closer an object is placed to first light sensor 465, the more defocused the reflected light becomes to first light sensor 465, and the more signal strength is lost because the defocused reflected light that arrives back at first light sensor 465 has a larger area than first light sensor 465. If optical gain control is implemented in this manner, first reflector 455 should also be sized accordingly to ensure that the signal strength of the light reflected from an object does not exceed that of the light reflected from first reflector 455. In this instance, first reflector 455 can be made smaller since doing so would narrow the region of interest along first lateral edge 120 to provide for a more accurate indication of off-platter events. In addition, the larger the defocus close to first light sensor 465, the less light is reflected to and detected by first light sensor 465, and the smaller the area of first reflector 455 needs to be to exceed the worst case signal from an object being weighed on weigh platter 105.

If off-platter detection assembly 400 is being designed to be used with various different barcode readers that have weigh platters with different lengths, the lens positioned in front of the light sensor can be configured to focus the field-of-view of the light sensor at a mid-point between the reflector distances of the various platter lengths.

Controller 490 is operatively coupled to first light source 410 and first light sensor 465 and can be located within housing 405 of off-platter detection assembly 400 or could be located within housing 15 of barcode reader 10 and in communication with first light source 410 and first light sensor 465. Preferably, if located within housing 405, controller 490 would be located in a portion of housing 405 that is below upper surface 110 of weigh platter 105 to minimize the amount of housing 405 that extends above upper surface 110. Controller 490 is configured to measure a first signal strength of the portion of first light 415 that is reflected towards and detected by first light sensor 465. Controller 490 can also be configured to determine if an object extends across first lateral edge 120 and off of weigh platter 105 by determining if the first signal strength of the reflected light is less than a first predetermined signal strength value, which is the signal strength of first light 415 reflected off of first reflector 455. If a measured first signal strength is equal to the first predetermined signal strength value, this indicates that there is no object extending across first lateral edge 120. If the measured first signal strength is less than the first predetermined signal strength, this indicates that there is an object extending across first lateral edge 120 and controller 490 can be configured to provide a first alert.

Figure 10:
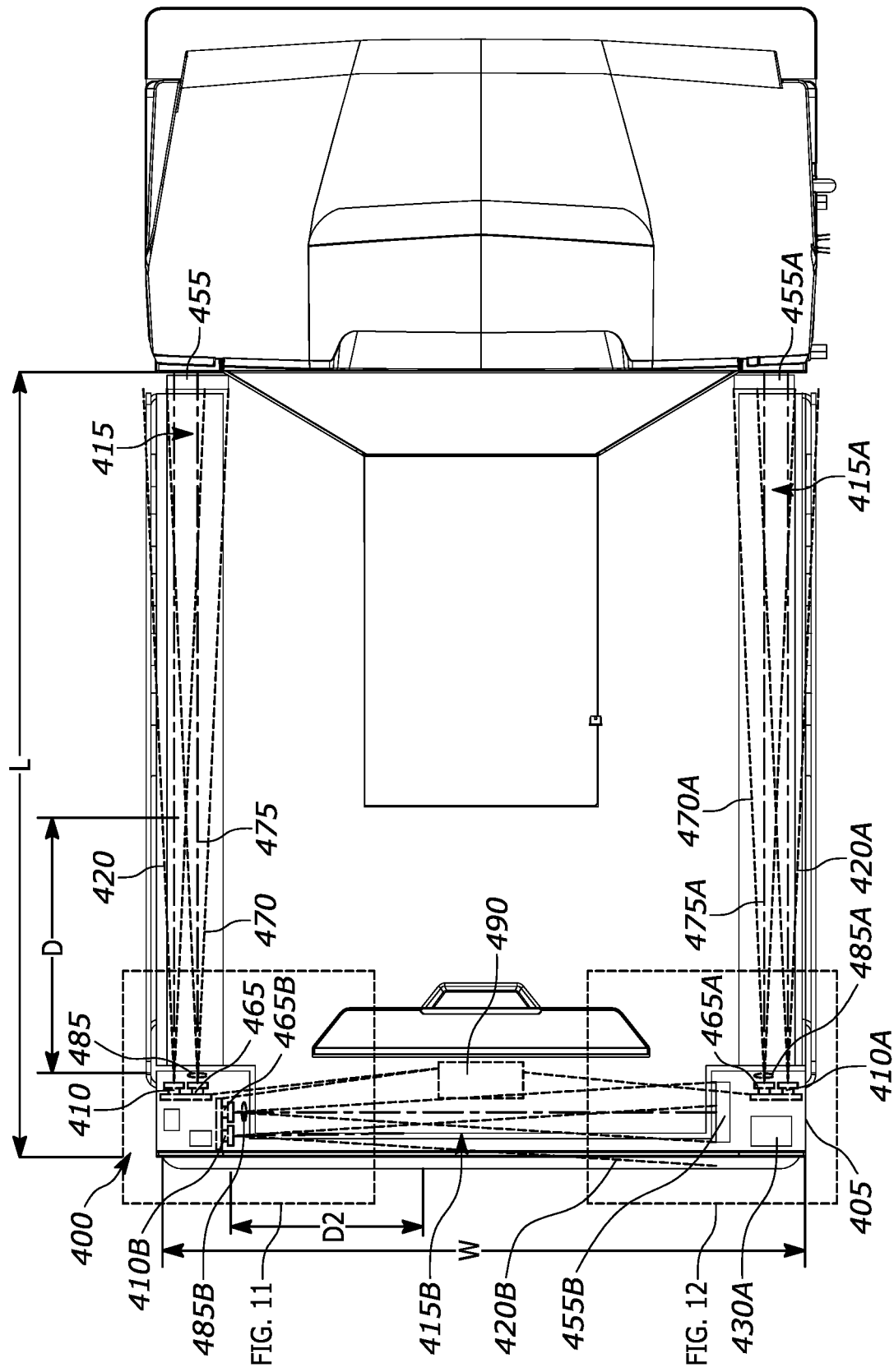
FIG. 10 illustrates a top view of the barcode reader of FIG. 1 with a third example off-platter detection assembly.
Figure 11:
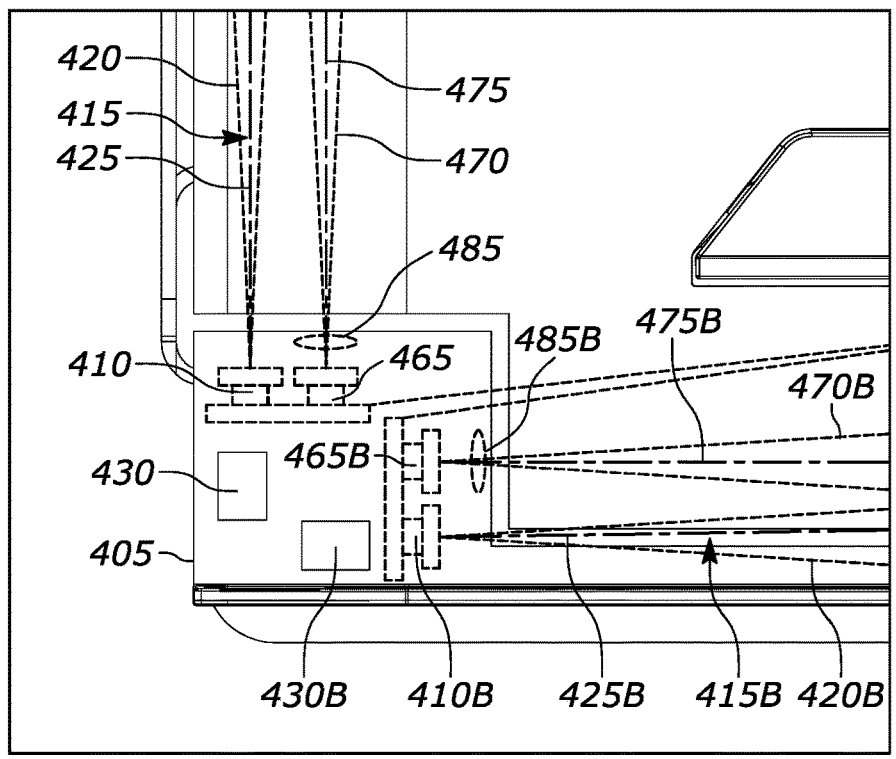
FIG. 11 is an enlarged view of a portion of the barcode reader of FIG. 10.
Figure 12:
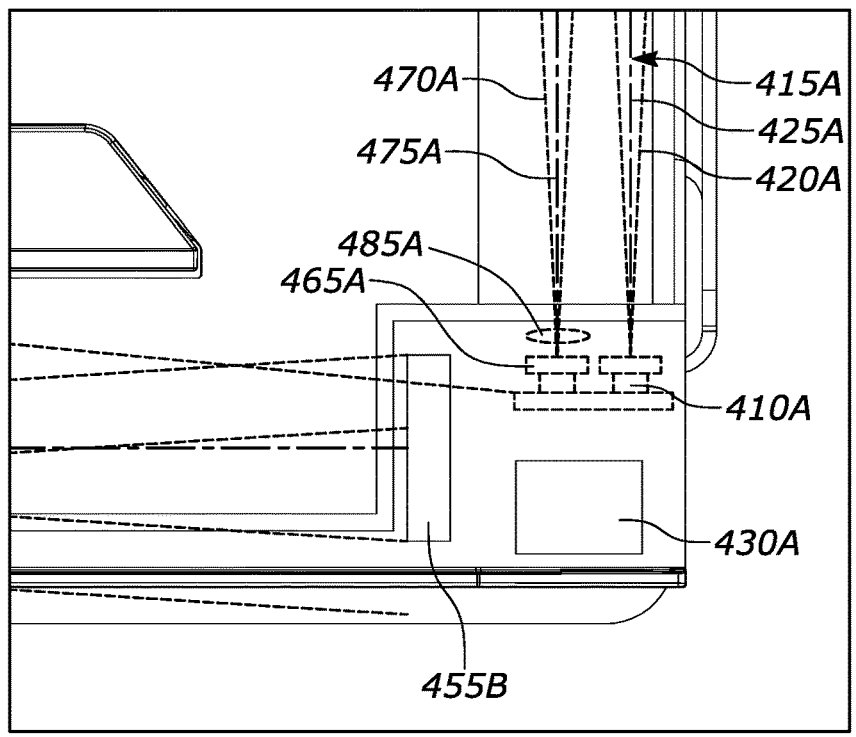
FIG. 12 is an enlarged view of another portion of the barcode reader of FIG. 10.
Figure 13:
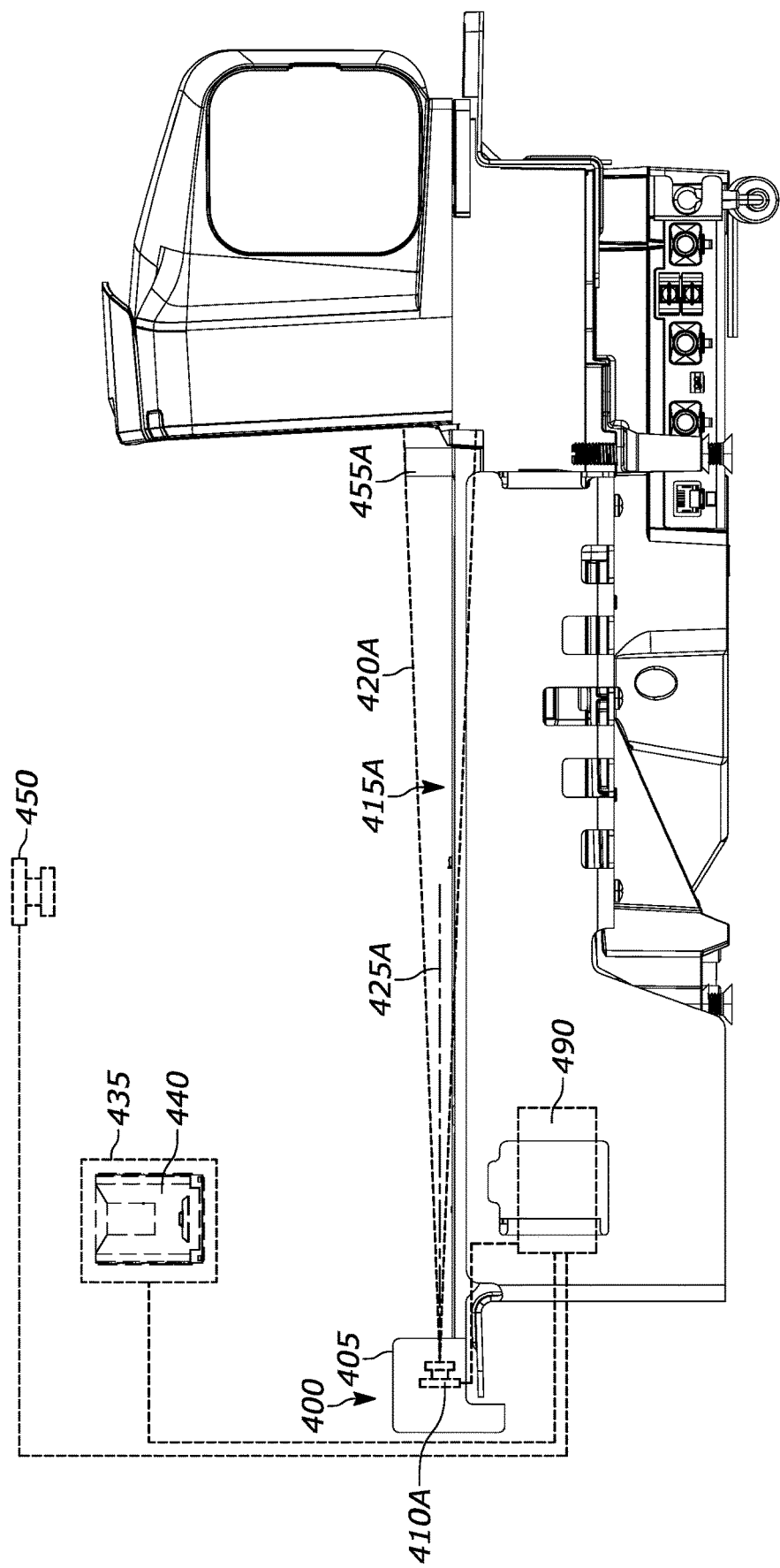
FIG. 13 is a side view of the barcode reader of FIG. 10 with an alternative alert system.

The first alert provided by controller 490 could be any type of alert that would inform a user that there is a possible off-platter event along first lateral edge 120 of weigh platter 105. For example, as shown in FIGS. 10-12, off-platter detection assembly 400 can have a first visual indicator 430, such as an LED light, set in a top portion of housing 405 and operatively coupled to controller 490 and the first alert could be controller 490 illuminating first visual indicator 430 to indicate to the user that there is a potential off-platter event along first lateral edge 120. In addition, controller 490 can be configured to, or be operatively coupled to a controller of barcode reader 10 to, prevent a measured weight of an object placed on weigh platter 105 from being recorded if the first signal strength is less than the first predetermined signal strength, indicating that an object is extending across first lateral edge 120.

Controller 490 can also be configured to determine a location of the object along first lateral edge 120 based on the first signal strength as the signal strength of the reflected light will be different when reflected from object at different distances from first light sensor 465. If controller 490 is configured to determine the location of the object along first lateral edge 120, in addition to or instead of illuminating visual indicator 430 as discussed above, as shown in FIG. 13 the first alert provided by controller 490 could be a display of a platter representation 440 on a visual display 435 operatively coupled to controller 490, such as the display of a POS operatively coupled to barcode reader 10, with an indication 445 of the location where the object extends over first lateral edge 120 displayed in platter representation 440. Platter representation 440 could be any representation of weigh platter 105, such as a live video feed received from an imaging assembly 450 positioned above weigh platter 105 and operatively coupled to controller 490, a photographic representation of weigh platter 105, or a drawing, illustration, or rendering of weigh platter 105.

In addition to monitoring first lateral edge 120 of weigh platter 105 with first light source 410, first light sensor 465, and first reflector 455, off-platter detection assembly 400 can also monitor second lateral edge 125 for potential off-platter events with a second light source 410A, a second light sensor 465A, both operatively coupled to controller 490, and a second reflector 455A.

As shown, second light source 410A is configured to emit a second light 415A along second lateral edge 125 of weigh platter 105 and away from distal edge 130, towards proximal edge 115. Alternatively, if housing 405 were positioned at proximal edge 115, rather than distal edge 130, or if second light source 410A were located in upper housing 30 rather than housing 405, second light source 410A would emit second light 415A along second lateral edge 125 and away from proximal edge 115, towards distal edge 130. Second light source 410A could be an LED or other type of light source that is focused into a narrow beam, similar to an aiming dot used in scanners, a focused laser beam, etc., and second light 415A emitted by second light source 410A could be a continuous light beam in the infrared spectrum. Second light 415A can have a second field-of-view 420A with a second central field-of-view axis 425A that extends parallel and generally adjacent to second lateral edge 125 of weigh platter 105.

Second light sensor 465A has a second field-of-view 470A along second lateral edge 125 and is configured to detect at least a portion of second light 415A that is reflected towards second light sensor 465A and within second field-of-view 470A. Second field-of-view 470A of second light sensor 465A also has a second central field-of-view axis 475A that extends parallel to second lateral edge 125 of weigh platter 105.

Second reflector 455A is positioned in a path of second light 415A and within second field-of-view 470A of second light sensor 465A such that second light 415A is reflected off of second reflector 455A towards second light sensor 465A and can be detected by second light sensor 465A. As shown, second reflector 455A is positioned at proximal edge 115 of weigh platter 105, opposite second light source 410A and second light sensor 465A. Alternatively, second reflector 455A could also be positioned on or adjacent upper housing 30 or weigh platter 105 of barcode reader 10 or in a recess formed in upper housing 30 or weigh platter 105 to protect second reflector 455A from damage. Conversely, if housing 405 were located at proximal edge 115 or if second light source 410A and second light sensor 465A were located in upper housing 30, as discussed above, second reflector 455A would be positioned at distal edge 130 of weigh platter. Second reflector 455A could be any type of reflective surface, such as a retroreflective sticker, a mirror, a corner cube retroreflector, or a cat's eye retroreflector, and preferably is sized appropriately to ensure that the signal strength of the reflected light from an object placed in front of second reflector 455A, such as a white object, does not exceed the signal strength of the reflected light from first reflector. For example, first reflector can have a width of approximately 11 millimeters and a height of approximately 6 millimeters to provide optimal reflection of second light 415A back to second light sensor 465A.

To prevent second light sensor 465A from detecting too much reflected light from an object being weighed, which could result in a failure to detect an off-platter event, second field-of-view 420A of second light 415A and second field-of-view 470A of second light sensor 465A overlap at a distance D from second light sensor 465A that is approximately 25% or greater of the length L of weigh platter 105 from proximal edge 115 to distal edge 130. The chance of such an occurrence is decreased significantly the further the point of overlap is extended out from second light sensor 465A since objects that are close to second light sensor 465A would not be "seen" by second light sensor 465A (although the object would still block the reflected light from second reflector 455A and, therefore, generate an off-platter event).

In addition, to achieve optical gain control, a second lens 485A can also be positioned in front of second light sensor 465A and configured to focus second field-of-view 470A of second light sensor 465A at second reflector 455A such that second field-of-view 470A of second light sensor 465A covers the entire second reflector 455A, which will also defocus second field-of-view 470A at points closer to second light sensor 465A. Doing this can maximize the amount of reflected light off of second reflector 455A that is seen by second light sensor 265A and maximize the signal strength detected by second light sensor 465A of second light 415A reflected from second reflector 455A and minimize the signal strength detected by second light sensor 465A of second light 415A reflected from objects closer to second light sensor 465A than second reflector 455A, since all of the reflected light from each point on second reflector 455A is returned to second light sensor 465A, which in turn maximizes the signal strength of the reflected light received from second reflector 455A. At the same time, the closer an object is placed to second light sensor 465A, the more defocused the reflected light becomes to second light sensor 465A, and the more signal strength is lost because the defocused reflected light that arrives back at second light sensor 465A has a larger area than second light sensor 465A. If optical gain control is implemented in this manner, second reflector 455A should also be sized accordingly to ensure that the signal strength of the light reflected from an object does not exceed that of the light reflected from second reflector 455A. In this instance, second reflector 455A can be made smaller since doing so would narrow the region of interest along second lateral edge 125 to provide for a more accurate indication of off-platter events. In addition, the larger the defocus close to second light sensor 465A, the less light is reflected to and detected by second light sensor 465A, and the smaller the area of second reflector 455A needs to be to exceed the worst case signal from an object being weighed on weigh platter 105.

Controller 490 is operatively coupled to second light source 410A and second light sensor 465A and can be located within housing 405 of off-platter detection assembly 400 or could be located within housing 15 of barcode reader 10 and in communication with second light source 410A and second light sensor 465A. Controller 490 is configured to measure a second signal strength of the portion of second light 415A that is reflected towards and detected by second light sensor 465A. Controller 490 can also be configured to determine if an object extends across second lateral edge 125 and off of weigh platter 105 by determining if the second signal strength of the reflected light is less than a second predetermined signal strength value, which is the signal strength of second light 415A reflected off of second reflector 455A. If a measured second signal strength is equal to the second predetermined signal strength value, this indicates that there is no object extending across second lateral edge 125. If the measured second signal strength is less than the second predetermined signal strength, this indicates that there is an object extending across second lateral edge 125 and controller 490 can be configured to provide a second alert.

The second alert provided by controller 490 could be any type of alert that would inform a user that there is a possible off-platter event along second lateral edge 125 of weigh platter 105. For example, as shown in FIGS. 10-12, off-platter detection assembly 400 can have a second visual indicator 430A, such as an LED light, set in a top portion of housing 405 and operatively coupled to controller 490 and the second alert could be controller 490 illuminating second visual indicator 430A to indicate to the user that there is a potential off-platter event along second lateral edge 125. In addition, controller 490 can be configured to, or be operatively coupled to a controller of barcode reader 10 to, prevent a measured weight of an object placed on weigh platter 105 from being recorded if the second signal strength is less than the second predetermined signal strength, indicating that an object is extending across second lateral edge 125.

Controller 490 can also be configured to determine a location of the object along second lateral edge 125 based on the second signal strength as the signal strength of the reflected light will be different when reflected from object at different distances from second light sensor 465A. If controller 490 is configured to determine the location of the object along second lateral edge 125, in addition to or instead of illuminating second visual indicator 430A as discussed above, as shown in FIG. 13 the second alert provided by controller 490 could be a display of a platter representation 440 on a visual display 435 operatively coupled to controller 490, such as the display of a POS operatively coupled to barcode reader 10, with an indication 445 of the location where the object extends over second lateral edge 125 displayed in platter representation 440. Platter representation 440 could be any representation of weigh platter 105, such as a live video feed received from an imaging assembly 450 positioned above weigh platter 105 and operatively coupled to controller 490, a photographic representation of weigh platter 105, or a drawing, illustration, or rendering of weigh platter 105.

In addition to monitoring first lateral edge 120 of weigh platter 105 with first light source 410, first light sensor 265, and first reflector 455 (and possibly second lateral edge 125 with second light source 410A, second light sensor 465A, and second reflector 455A), off-platter detection assembly 400 can also monitor distal edge 130 for potential off-platter events with a third light source 410B, a third light sensor 465B, both operatively coupled to controller 290, and a third reflector 455B.

As shown, third light source 410B is configured to emit a third light 415B along distal edge 130 of weigh platter 105. Third light source 410B could be an LED or other type of light source that is focused into a narrow beam, similar to an aiming dot used in scanners, a focused laser beam, etc., and third light 415B emitted by third light source 410B could be a continuous light beam in the infrared spectrum. Third light 415B can have a third field-of-view 420B with a third central field-of-view axis 425B that extends parallel and generally adjacent to distal edge 130 of weigh platter 105.

Third light sensor 465B has a third field-of-view 470B along distal edge 130 and is configured to detect at least a portion of third light 415B that is reflected towards third light sensor 465B and within third field-of-view 470B. Third field-of-view 470B of third light sensor 465B also has a third central field-of-view axis 475B that extends parallel to distal edge 130 of weigh platter 105.

Third reflector 455B is positioned in a path of third light 415B and within third field-of-view 470B of third light sensor 465B such that third light 415B is reflected off of third reflector 455B towards third light sensor 465B and can be detected by third light sensor 465B. As shown, third reflector 455B is positioned opposite third light source 410B and third light sensor 465B. Third reflector 455B could be any type of reflective surface, such as a retroreflective sticker, a mirror, a corner cube retroreflector, or a cat's eye retroreflector, and preferably is sized appropriately to ensure that the signal strength of the reflected light from an object placed in front of third reflector 455B, such as a white object, does not exceed the signal strength of the reflected light from first reflector.

To prevent third light sensor 465B from detecting too much reflected light from an object being weighed, which could result in a failure to detect an off-platter event, third field-of-view 420B of third light 415B and third field-of-view 470B of third light sensor 465B overlap at a distance D2 from third light sensor 465B that is approximately 25% or greater of the width W of weigh platter 105 from first lateral edge 120 to second lateral edge 125. The chance of such an occurrence is decreased significantly the further the point of overlap is extended out from third light sensor 465B since objects that are close to third light sensor 465B would not be "seen" by third light sensor 465B (although the object would still block the reflected light from third reflector 455B and, therefore, generate an off-platter event).

In addition, to achieve optical gain control, a third lens 485B can also be positioned in front of third light sensor 465B and configured to focus third field-of-view 470B of third light sensor 465B at third reflector 455B such that third field-of-view 470B of third light sensor 465B covers the entire third reflector 455B, which will also defocus third field-of-view 470B at points closer to third light sensor 465B. Doing this can maximize the amount of reflected light off of third reflector 455B that is seen by third light sensor 265B and maximize the signal strength detected by third light sensor 465B of third light 415B reflected from third reflector 455B and minimize the signal strength detected by third light sensor 465B of third light 415B reflected from objects closer to third light sensor 465B than third reflector 455B, since all of the reflected light from each point on third reflector 455B is returned to third light sensor 465B, which in turn maximizes the signal strength of the reflected light received from third reflector 455B. At the same time, the closer an object is placed to third light sensor 465B, the more defocused the reflected light becomes to third light sensor 465B, and the more signal strength is lost because the defocused reflected light that arrives back at third light sensor 465B has a larger area than third light sensor 465B. If optical gain control is implemented in this manner, third reflector 455B should also be sized accordingly to ensure that the signal strength of the light reflected from an object does not exceed that of the light reflected from third reflector 455B. In this instance, third reflector 455B can be made smaller since doing so would narrow the region of interest along distal edge 130 to provide for a more accurate indication of off-platter events. In addition, the larger the defocus close to third light sensor 465B, the less light is reflected to and detected by third light sensor 465B, and the smaller the area of third reflector 455B needs to be to exceed the worst case signal from an object being weighed on weigh platter 105.

Controller 490 is operatively coupled to third light source 410B and third light sensor 465B and can be located within housing 405 of off-platter detection assembly 400 or could be located within housing 15 of barcode reader 10 and in communication with third light source 410B and third light sensor 465B. Controller 490 is configured to measure a third signal strength of the portion of third light 415B that is reflected towards and detected by third light sensor 465B. Controller 490 can also be configured to determine if an object extends across distal edge 130 and off of weigh platter 105 by determining if the third signal strength of the reflected light is less than a third predetermined signal strength value, which is the signal strength of third light 415B reflected off of third reflector 455B. If a measured third signal strength is equal to the third predetermined signal strength value, this indicates that there is no object extending across distal edge 130. If the measured third signal strength is less than the third predetermined signal strength, this indicates that there is an object extending across distal edge 130 and controller 490 can be configured to provide a third alert.

The third alert provided by controller 490 could be any type of alert that would inform a user that there is a possible off-platter event along distal edge 130 of weigh platter 105. For example, as shown in FIGS. 10-12, off-platter detection assembly 400 can have a third visual indicator 430B, such as an LED light, set in a top portion of housing 405 and operatively coupled to controller 490 and the third alert could be controller 490 illuminating third visual indicator 430B to indicate to the user that there is a potential off-platter event along distal edge 130. In addition, controller 490 can be configured to, or be operatively coupled to a controller of barcode reader 10 to, prevent a measured weight of an object placed on weigh platter 105 from being recorded if the third signal strength is less than the third predetermined signal strength, indicating that an object is extending across distal edge 130.

Controller 490 can also be configured to determine a location of the object along distal edge 130 based on the third signal strength as the signal strength of the reflected light will be different when reflected from object at different distances from third light sensor 465B. If controller 490 is configured to determine the location of the object along distal edge 130, in addition to or instead of illuminating third visual indicator 430B as discussed above, as shown in FIG. 13 the third alert provided by controller 490 could be a display of a platter representation 440 on a visual display 435 operatively coupled to controller 490, such as the display of a POS operatively coupled to barcode reader 10, with an indication 445 of the location where the object extends over distal edge 130 displayed in platter representation 440. Platter representation 440 could be any representation of weigh platter 105, such as a live video feed received from an imaging assembly 450 positioned above weigh platter 105 and operatively coupled to controller 490, a photographic representation of weigh platter 105, or a drawing, illustration, or rendering of weigh platter 105.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s).

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An off-platter detection assembly for use with a barcode reader configured to be supported by a workstation, the off-platter detection assembly comprising:
   a first light source configured to emit a first light along a first lateral edge of a weigh platter of the barcode reader;
   a first light sensor having a first field-of-view along the first lateral edge, the first light sensor configured to detect at least a portion of the first light reflected within the first field-of-view; and
   a controller operatively coupled to the first light source and the first light sensor, the controller configured to provide a first alert in response to receipt of a first value from the first light sensor indicating that there is an object extending across the first lateral edge, wherein:
   the first light source emits the first light as pulses of light; and
   the controller is configured to measure a first time-of-flight (TOF), the first TOF comprising the time a pulse of light is emitted by the first light source to the time the portion of the first light reflected is detected by the first light sensor, and provide the first alert in response to the first TOF being less than a first predetermined TOF.

2. The off-platter detection assembly of claim 1, wherein the controller is configured to determine a location where the object extends over the first lateral edge and the first alert is a display of a platter representation with an indication of the location where the object extends over the first lateral edge displayed in the platter representation on a visual display operatively coupled to the controller in response to the controller determining that the object does extend over the first lateral edge.

3. The off-platter detection assembly of claim 2, wherein the platter representation is one of a live video feed received from an imaging assembly positioned above the weigh platter, a photographic representation of the weigh platter, or a rendering of the weigh platter.

4. The off-platter detection assembly of claim 1, comprising:
   a second light source configured to emit a second light along a second lateral edge of the weigh platter, opposite the first lateral edge; and
   a second light sensor having a second field-of-view along the second lateral edge, the second light sensor configured to detect at least a portion of the second light reflected within the second field-of-view; wherein
   the controller is operatively coupled to the second light source and the second light sensor and is configured to provide a second alert in response to receipt of a second value from the second light sensor indicating that there is an object extending across the second lateral edge.

5. The off-platter detection assembly of claim 4, wherein the controller is configured to determine a location where the object extends over the second lateral edge and the second alert is display of a platter representation with an indication of the location where the object extends over the second lateral edge displayed in the platter representation on a visual display operatively coupled to the controller in response to the controller determining that the object does extend over the second lateral edge.

6. The off-platter detection assembly of claim 5, wherein the platter representation is one of a live video feed received from an imaging assembly positioned above the weigh platter, a photographic representation of the weigh platter, or a rendering of the weigh platter.

7. The off-platter detection assembly of claim 4, comprising:
   a third light source configured to emit a third light along a distal edge of the weigh platter; and
   a third light sensor having a third field-of-view along the distal edge, the third light sensor configured to detect at least a portion of the third light reflected within the third field-of-view,
   wherein the controller is operatively coupled to the third light source and the third light sensor and is configured to provide a third alert in response to receipt of a third value from the third light sensor indicating that there is an object extending across the distal edge.

8. The off-platter detection assembly of claim 7, wherein the controller is configured to determine a location where the object extends over the distal edge and the third alert is a display of a platter representation with an indication of the location where the object extends over the distal edge displayed in the platter representation on a visual display operatively coupled to the controller in response to the controller determining that the object does extend over the distal edge.

9. The off-platter detection assembly of claim 8, wherein the platter representation is one of a live video feed received from an imaging assembly positioned above the weigh platter, a photographic representation of the weigh platter, or a rendering of the weigh platter.

10. The off-platter detection assembly of claim 1, further comprising a first lens positioned in front of the first light sensor and configured to focus the portion of the first light reflected within the first field-of-view onto the first light sensor.

11. The off-platter detection assembly of claim 1, further comprising a first visual indicator operatively coupled to the controller, wherein the first alert includes the controller illuminating the first visual indicator.

12. The off-platter detection assembly of claim 1, wherein the controller is operatively coupled to a controller of the barcode reader and is configured to prevent a measured weight of an object placed on the weigh platter from being recorded in response receipt of the first value from the first light sensor.

13. The off-platter detection assembly of claim 1, wherein:
   the first light source emits the first light in the infrared spectrum; and
   the controller is configured to measure a first signal strength of the portion of the first light reflected towards the housing and detected by the first light sensor and provide the first alert in response to the first signal strength being greater than a predetermined strength value.

14. The off-platter detection assembly of claim 1, wherein the first predetermined TOF is from a time the pulse of light is emitted by the first light source to a time the portion of the first light reflected within the first field-of-view from an upper housing of the barcode reader is detected by the first light sensor.

* * * * *